(12) United States Patent
Danziger et al.

(10) Patent No.: US 11,409,103 B2
(45) Date of Patent: Aug. 9, 2022

(54) LIGHT-GUIDE OPTICAL ELEMENT EMPLOYING POLARIZED INTERNAL REFLECTORS

(71) Applicant: Lumus Ltd., Ness Ziona (IL)

(72) Inventors: Yochay Danziger, Kfar Vradim (IL); Daniel Michaels, Ramat Gan (IL)

(73) Assignee: Lumus Ltd., Ness Ziona (IL)

( * ) Notice: Subject to any disclaimer, the term of this patent is extended or adjusted under 35 U.S.C. 154(b) by 38 days.

(21) Appl. No.: 16/982,656

(22) PCT Filed: Jul. 16, 2019

(86) PCT No.: PCT/IB2019/056057
§ 371 (c)(1),
(2) Date: Sep. 21, 2020

(87) PCT Pub. No.: WO2020/016772
PCT Pub. Date: Jan. 23, 2020

(65) Prior Publication Data
US 2021/0033862 A1    Feb. 4, 2021

Related U.S. Application Data

(60) Provisional application No. 62/698,300, filed on Jul. 16, 2018.

(51) Int. Cl.
*G02B 27/01* (2006.01)
*F21V 8/00* (2006.01)
*G02B 5/30* (2006.01)

(52) U.S. Cl.
CPC ........ *G02B 27/0101* (2013.01); *G02B 6/0015* (2013.01); *G02B 6/0056* (2013.01); *G02B 5/3058* (2013.01); *G02B 2027/0118* (2013.01)

(58) Field of Classification Search
CPC .............. G02B 27/0172; G02B 27/017; G02B 27/0101; G02B 27/01; G02B 2027/0178;
(Continued)

(56) References Cited

U.S. PATENT DOCUMENTS

| 5,430,505 A | 7/1995 | Katz |
| 5,712,694 A | 1/1998 | Taira et al. |

(Continued)

FOREIGN PATENT DOCUMENTS

| JP | 3 1996313843 | 11/1996 |
| JP | 2012-037761 U | 2/2012 |
| WO | WO2015012280 | 3/2017 |

OTHER PUBLICATIONS

Mukawa et al. A full-color eyewear display using planar waveguides with reflection volume holograms. Journal of the Society for Information Display—J Soc Inf Disp, Mar. 17, 2009. 10.1889/JSID17.3.185-187 Mar. 31, 2009 (Mar. 31, 2009) pp. 285-287.

*Primary Examiner* — Ryan A Lepisto
*Assistant Examiner* — Mary A El-Shammaa
(74) *Attorney, Agent, or Firm* — Mark M. Friedman (57) ABSTRACT

A light-guide optical element (LOE) includes a transparent substrate having two parallel major external surfaces for guiding light within the substrate by total internal reflection (TIR). Mutually parallel internal surfaces within the LOE are provided with a structural polarizer which is transparent to light polarized parallel to a primary polarization transmission axis, and is partially or fully reflective to light polarized perpendicular to the primary polarization transmission axis. By suitable orientation of the polarization axis of successive internal surfaces together with the polarization mixing properties of TIR and/or use of birefringent materials, it is possible to achieve the desired proportion of coupling-out of the image illumination from each successive facet.

17 Claims, 9 Drawing Sheets

(58) Field of Classification Search
CPC ... G02B 5/3058; G02B 6/0015; G02B 6/0056
See application file for complete search history.

(56) References Cited

U.S. PATENT DOCUMENTS

| | | |
|---|---|---|
| 6,154,321 A | 11/2000 | Melville et al. |
| 6,231,992 B1 | 5/2001 | Niebauer et al. |
| 6,239,092 B1 | 5/2001 | Papasso et al. |
| 6,404,550 B1 | 6/2002 | Yajima |
| 6,542,307 B2 | 4/2003 | Gleckman et al. |
| 6,671,100 B1 | 12/2003 | McRuer |
| 8,187,481 B1 | 5/2012 | Hobbs |
| 8,665,178 B1 | 3/2014 | Wang |
| 10,222,535 B2 | 3/2019 | Remhof et al. |
| 2003/0165017 A1 | 9/2003 | Amitai |
| 2004/0032660 A1 | 2/2004 | Amitai |
| 2004/0033528 A1 | 2/2004 | Amitai |
| 2005/0024849 A1 | 2/2005 | Parker et al. |
| 2005/0078388 A1 | 4/2005 | Amitai |
| 2005/0083592 A1 | 4/2005 | Amitai et al. |
| 2005/0180687 A1 | 8/2005 | Amitai |
| 2007/0091445 A1 | 4/2007 | Amitai |
| 2007/0097513 A1 | 5/2007 | Amitai |
| 2007/0155277 A1 | 7/2007 | Amitai et al. |
| 2008/0025667 A1 | 1/2008 | Amitai |
| 2008/0106775 A1 | 5/2008 | Amitai et al. |
| 2008/0151375 A1 | 6/2008 | Lin |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2010/0171680 A1 | 7/2010 | Lapidot et al. |
| 2010/0201953 A1 | 8/2010 | Freeman |
| 2010/0214635 A1 | 8/2010 | Sasaki et al. |
| 2011/0096566 A1 | 4/2011 | Tsai et al. |
| 2011/0109880 A1 | 5/2011 | Nummela |
| 2012/0179369 A1 | 7/2012 | Lapidot et al. |
| 2013/0135749 A1 | 5/2013 | Akutsu et al. |
| 2013/0208362 A1 | 8/2013 | Bohn et al. |
| 2013/0229717 A1 | 9/2013 | Amitai |
| 2013/0276960 A1 | 10/2013 | Amitai |
| 2013/0279017 A1 | 10/2013 | Amitai |
| 2014/0019801 A1 | 1/2014 | Lamb et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2015/0138451 A1 | 5/2015 | Amitai |
| 2015/0182348 A1 | 7/2015 | Siegal et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0277127 A1 | 10/2015 | Amitai |
| 2015/0289762 A1 | 10/2015 | Popovich et al. |
| 2015/0293360 A1 | 10/2015 | Amitai |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0341964 A1 | 11/2016 | Amitai |
| 2016/0349518 A1 | 12/2016 | Amitai et al. |
| 2017/0045744 A1 | 2/2017 | Amitai |
| 2017/0052376 A1 | 2/2017 | Amitai |
| 2017/0052377 A1 | 2/2017 | Amitai |
| 2017/0336636 A1 | 11/2017 | Amitai et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0192089 A1 | 6/2020 | Haddick et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292818 A1 | 9/2020 | Amitai et al. |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Lumus |
| 2021/0116367 A1 | 4/2021 | Gelberg et al. |
| 2021/0141141 A1 | 5/2021 | Danziger et al. |
| 2021/0149204 A1 | 5/2021 | Amitai et al. |
| 2021/0157150 A1 | 5/2021 | Amitai |
| 2021/0165231 A1 | 6/2021 | Gelberg et al. |

LIGHT-GUIDE OPTICAL ELEMENT EMPLOYING POLARIZED INTERNAL REFLECTORS

FIELD AND BACKGROUND OF THE INVENTION

The present invention relates to display systems and, in particular, it concerns a light-guide optical element suitable for use in a display.

Certain display technologies, particularly suitable for head-up displays such as near-eye displays for virtual reality and augmented reality applications, employ a light-guide optical element, also referred to as a "waveguide", with a series of internal oblique mutually-parallel partially-reflecting planes (or "facets"). An image projector is optically coupled to the waveguide and injects light corresponding to a collimated image into the waveguide so as to propagate along the waveguide by internal reflection and to be progressively coupled out of the waveguide towards the observer's eye by reflection at the sequence of facets, thereby expanding the effective aperture optical aperture opposite the eye compared to the projector's output aperture.

Reflectivity of the facets is sensitive to polarization and angle. Dielectric coatings are typically used to generate a desired reflectivity pattern.

As the light propagates within the waveguide, it is reflected by the external faces at angles of Total Internal Reflection (TIR). This type of reflection generates a phase change between the S polarization and the P polarization. Consequently light propagating at S or P polarization will maintain its polarization, while combined polarization (diagonal or elliptical) having components of both polarizations, will change orientation.

SUMMARY OF THE INVENTION

The present invention is a light-guide optical element.

According to the teachings of an embodiment of the present invention there is provided, a light-guide optical element comprising: (a) a transparent substrate having at least two parallel major external surfaces for guiding light within the substrate by internal reflection at the external surfaces; and (b) a plurality of mutually parallel internal surfaces deployed within the substrate non-parallel to the major external surfaces, at least part of each of the internal surfaces comprising a structural polarizer having a primary polarization transmission axis, the structural polarizer being substantially transparent to light polarized parallel to the primary polarization transmission axis and being at least partially reflective to light polarized perpendicular to the primary polarization transmission axis.

According to a further feature of an embodiment of the present invention, the primary polarization transmission axis is rotated for each successive internal surface relative to a preceding one of the internal surfaces.

According to a further feature of an embodiment of the present invention, the primary polarization transmission axis of the structural polarizer is rotated in a first direction between a first of the internal surfaces and a subsequent one of the internal surfaces, and is rotated in a second direction, opposite to the first direction, between the subsequent one of the internal surfaces and a further subsequent one of the internal surfaces.

According to a further feature of an embodiment of the present invention, the primary polarization transmission axis of the structural polarizer is rotated through a first angle between a first of the internal surfaces and a subsequent one of the internal surfaces, and is rotated through a second angle, greater than the first angle, between the subsequent one of the internal surfaces and a further subsequent one of the internal surfaces.

According to a further feature of an embodiment of the present invention, the structural polarizer is substantially fully reflective to light polarized perpendicular to the primary polarization transmission axis.

According to a further feature of an embodiment of the present invention, at least part of the substrate is formed from a material exhibiting birefringence.

According to a further feature of an embodiment of the present invention, the primary polarization transmission axis is parallel for at least two successive internal surfaces of the plurality of the internal surfaces.

According to a further feature of an embodiment of the present invention, the substrate has a thickness measured between the major external surfaces, and wherein the structural polarizer extends across less than an entirety of the thickness.

According to a further feature of an embodiment of the present invention, the structural polarizer spans less than half of the thickness.

According to a further feature of an embodiment of the present invention, the structural polarizer does not extend to either of the major external surfaces.

According to a further feature of an embodiment of the present invention, there is also provided an additional set of mutually parallel internal surfaces deployed within the substrate non-parallel to the major external surfaces, at least part of each surface of the additional set of internal surfaces comprising a multilayer partially-reflective dielectric coating.

According to a further feature of an embodiment of the present invention, the additional set of internal surfaces are parallel with the plurality of internal surfaces.

According to a further feature of an embodiment of the present invention, the additional set of internal surfaces are interleaved with the plurality of internal surfaces.

According to a further feature of an embodiment of the present invention, surfaces of the additional set of internal surfaces are coplanar with surfaces of the plurality of internal surfaces.

According to a further feature of an embodiment of the present invention, a thickness of the substrate is subdivided into a first layer and a second layer, and wherein the plurality of internal surfaces are located within the first layer and the additional set of internal surfaces are located within the second layer.

There is also provided according to the teachings of an embodiment of the present invention, a display for providing an image to an eye of an observer comprising: (a) the aforementioned light-guide optical element; and (b) an image projector generating a collimated image, the image projector being optically coupled to the light-guide optical element so as to introduce the collimated image into the light-guide optical element so as to propagate by internal reflection within the light-guide optical element, wherein the plurality of internal surfaces are oriented to couple out part of the collimated image towards the eye of the observer.

According to a further feature of an embodiment of the present invention, there is also provided an absorbent polarizer deployed on a side of the substrate further from the observer, the absorbent polarizer having an axis of polarization aligned with an average direction of the primary polarization transmission axes of the structural polarizers.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a light-guide optical element (LOE) and corresponding display systems employing such LOEs.

The principles and operation of LOEs according to the present invention may be better understood with reference to the drawings and the accompanying description.

Before addressing the drawings, in general terms, a light-guide optical element according to an aspect of the present invention includes a transparent substrate having at least two parallel major external surfaces for guiding light within the substrate by internal reflection at the external surfaces. Deployed within the substrate are a plurality of mutually parallel internal surfaces, which are non-parallel to the major external surfaces. At least part of each of the internal surfaces is provided with a structural polarizer having a primary polarization transmission axis. The structural polarizer is substantially transparent (more than 90% transmission) to light polarized parallel to the primary polarization transmission axis, and is at least partially reflective to light polarized perpendicular to the primary polarization transmission axis. By suitable orientation of the polarization axis of successive internal surfaces together with the polarization mixing properties of TIR and/or use of birefringent materials, it is possible to achieve the desired proportion of coupling-out of the image illumination from each successive facet.

Certain preferred embodiments of the present invention employ an Orientation Sensitive Polarization Reflector (or "structural polarizer") that transmits one incident polarization and reflects the orthogonal polarization according the reflector's inherent axis orientation. Examples of such structural polarizers include wire-grid film (for example commercially available from Moxtek Inc. of Utah, USA) where the orientation of the wires determines the reflected polarization. Another example of a structural polarizer is a birefringent dielectric coating or film commercially available from the 3M Company of Minnesota, USA. The "structural polarizer" terminology of the present invention is not limited to these examples, and refers generically to any and all polarization-selective element which has anisotropic optical properties such that plane-polarized light incident with its electric field vector parallel to a first axis is primarily/majority reflected and plane-polarized light incident with its electric field vector perpendicular to the first axis is primarily/majority transmitted. Most preferably, the transmitted polarization exhibits more than 90% transmission (referred to as "substantially transparent"), and most preferably over 95% transmission. Conversely, the reflected polarization in certain implementations is "substantially completely reflective" (exhibiting more than 90% reflection), and most preferably over 95% reflection. In certain preferred cases, separation between the two polarization axes is substantially complete, with less than 1% of the transmitted polarization being reflected, and less than 1% of the reflected polarization being transmitted. A mixed polarization, or a plane-polarized beam with a plane of polarization at an intermediate angle relative to the principle axes will be resolved into components parallel and perpendicular to the first axis, and will be partially reflected and partially transmitted in proportions corresponding to the cosine of the angle to the corresponding axis.

In an alternative set of implementations, the reflectivity of the structural polarizer can be modified for example by changing the conductivity of the wire-grid, the dielectric coating parameters or by rotation of its axis relative to the impinging light polarization. For example, a wire-grid polarizer adjusted in this manner may continue to transmit P polarization but may have a reduced reflectivity for S polarization reduced to a chosen value, such as for example, 80% or 50%, with the remaining S polarization being transmitted. This adds an additional degree of freedom to system design. For example, it would be possible to have the same orientation of some or all of the facets, and then adjust the proportion of S polarization coupled out by using successively increasing reflectivity from facet to facet.

According to an aspect of the present invention, a structural polarizer is used as the reflecting mechanism of the facets where its axis differs from the axis of the waveguide, i.e., being non-parallel and non-perpendicular to the major surfaces of the substrate. Implementation of the structural polarizer on the facet can be by application of a film or by direct coating. The sequence of facets are preferably constructed by forming a stack of plates bonded together with suitable films or coatings at their interfaces, and then cutting and polishing the stack at an appropriate angle to form the internal facets, optionally with additional facing layers and/or other layers sandwiching the layer with the internal surfaces (as exemplified below).

Figure 1:
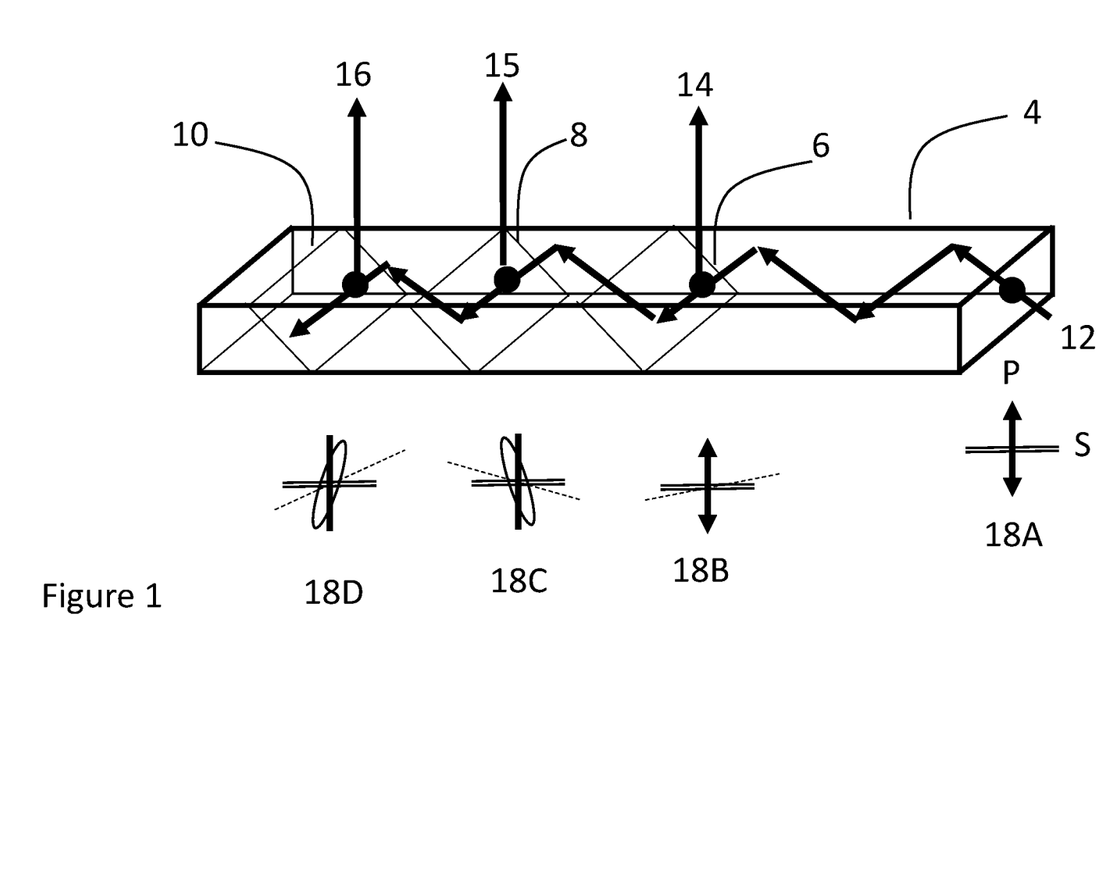
FIG. 1 is a schematic representation of a light-guide optical element (LOE) used in a display system, constructed and operative according to the teachings of an aspect of the present invention, illustrating the progression of polarization in a ray passing through a sequence of structural polarizer internal facets.

FIG. 1 describes an architecture according to an aspect of this invention. The waveguide 4 has facets 6, 8 and 10 (only three depicted for clarity). Polarized Light ray 12 is injected into the waveguide and propagates while being reflected in the waveguide by TIR. As the ray passes through the facets (marked as circular dots), part of the light is reflected and coupled-out of the substrate, illustrated here as ray 14 from facet 6, ray 15 from facet 8 and ray 16 from facet 10. Ray 12 and the resulting coupled-out rays 14-16 represent a single ray of a collimated image which includes differently angled rays for each pixel of the image, but the same principles apply to each.

Polarization schemes 18A-18D show the polarization orientation of the light as observed from the propagating ray. 18A show the injected ray P polarization that is vertical to the reflecting waveguide faces where S is polarization horizontal to the waveguide (in this example has no energy). Since only one polarization is exited (P as shown by the double-headed arrow in 18A), this polarization will be maintained during TIR propagation in waveguide 4. Scheme 18B shows the ray's P polarization as it impinges on facet 6 (double-headed arrow) and the dashed line represents schematically the structural polarizer reflecting axis on facet 6 as viewed along the direction of propagation. If the reflecting axis of facet 6 was perpendicular to the polarization of ray P then no light would be reflected out as ray 14, however the reflecting axis (dashed line in 18B) is deliberately slightly tilted (rotated). The tilting angle determines the amount of light coupled out of the waveguide as 14, in a proportion approximating to the sine of the tilt angle.

Most of the light energy continues to propagate within the waveguide as TIR. However since the remaining light polarization is slightly off perpendicular to the waveguide face, it will deviate further from perpendicularity with every TIR. This deviation is represented by the ellipse in 18C. Here, the propagating light ray deviates from perpendicularity to the substrate axes as it impinges on facet 8. In order to minimize the drift from perpendicularity, in certain cases, it is preferred to tilt the structural polarizer axis of the next facet 8 in the opposite direction from the original polarization relative to facet 6, as shown by the dashed line in 18C relative to 18B. Light ray 15 is generated with an intensity dictated by the component of polarization of the impinging light (the ellipse) parallel to the structural polarizer reflection axis (dashed line), which is perpendicular to the primary polarization transmission axis. In other cases, there may be advantages for image uniformity if the rotation between adjacent facet polarization axes advances progressively in the same direction.

The same process described in scheme 18C is repeated on facet 10 and described as scheme 18D.

The periodic twist of the structural polarizer limits the drift of the polarization of the propagating light ray and consequently enables uniform light extraction along the waveguide and more efficient extraction of light energy toward the observer.

As the light 12 propagates within the waveguide, its energy reduces. Therefore, illumination uniformity is improved by increasing the out-coupling of the facets further away from the light injection point. This is achieved by increasing the structural polarizer twisting angle from facet to facet as shown in FIG. 1. The twist of the structural polarizer (dashed line) increases from facet 6 (18B) to facet 8 (18C) to facet 10 (18D). The use of rotation of the structural polarizer relative to the preceding facet to adjust the proportion of out-coupling at each successive facet provides a particularly simple structure for fabrication, since the structural components used at each facet are essentially the same, without requiring fabrication of uniquely layered structures at each successive interface.

Figure 2:
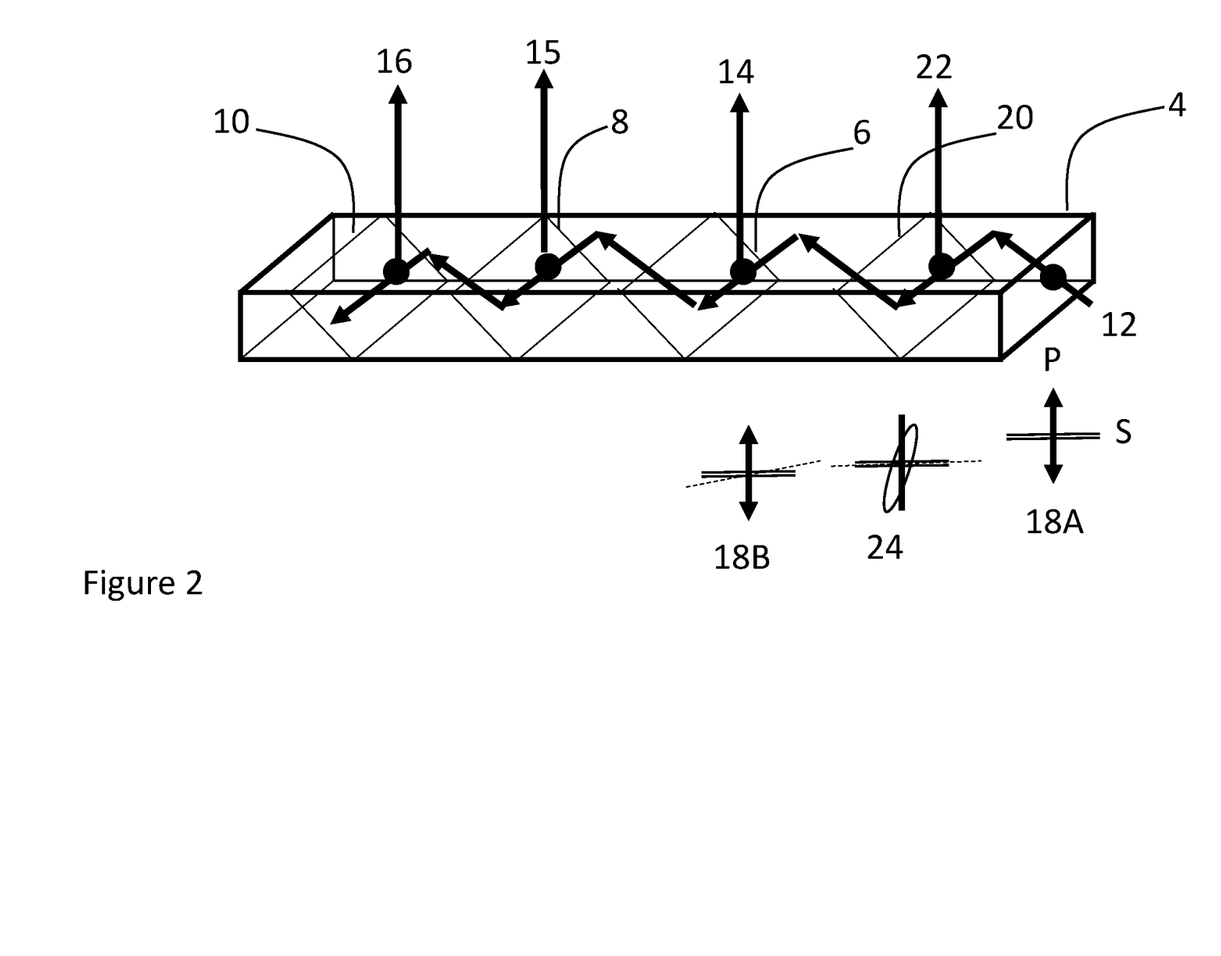
FIG. 2 is a schematic representation similar to FIG. 1, showing the addition of a polarization conditioning internal facet at the beginning of the LOE.

In certain implementations, the material of the waveguide may advantageously be uniform and isotropic so no birefringence exists and less polarization deviations are introduced to the light rays. However, in some cases, it may be preferable to form the waveguide of plastic, in which case some birefringence exist. According to certain implementation of the present invention, these deviations are filtered out, since every facet out-couples the energy that deviated (by TIR or other), forcing the transmitted light into a plane-polarized configuration according to the axes of the structural polarizer. In FIG. 2, an additional facet 20 is introduced having a structural polarizer axis parallel to that of the waveguide 24. Consequently, any deviation introduced by material birefringence or inaccurate input coupling (represented as elliptical polarization in 24) will be coupled out and further degradation of polarization orientation is suppressed. This ensures that facet 6 receives the nominal polarization as described in FIG. 1.

This additional polarizing facet can be at any angle (not necessarily reflecting the deviated light to the observer) and can be incorporated in systems where the reflecting facets are dielectric without any structural polarizer.

Figure 3:
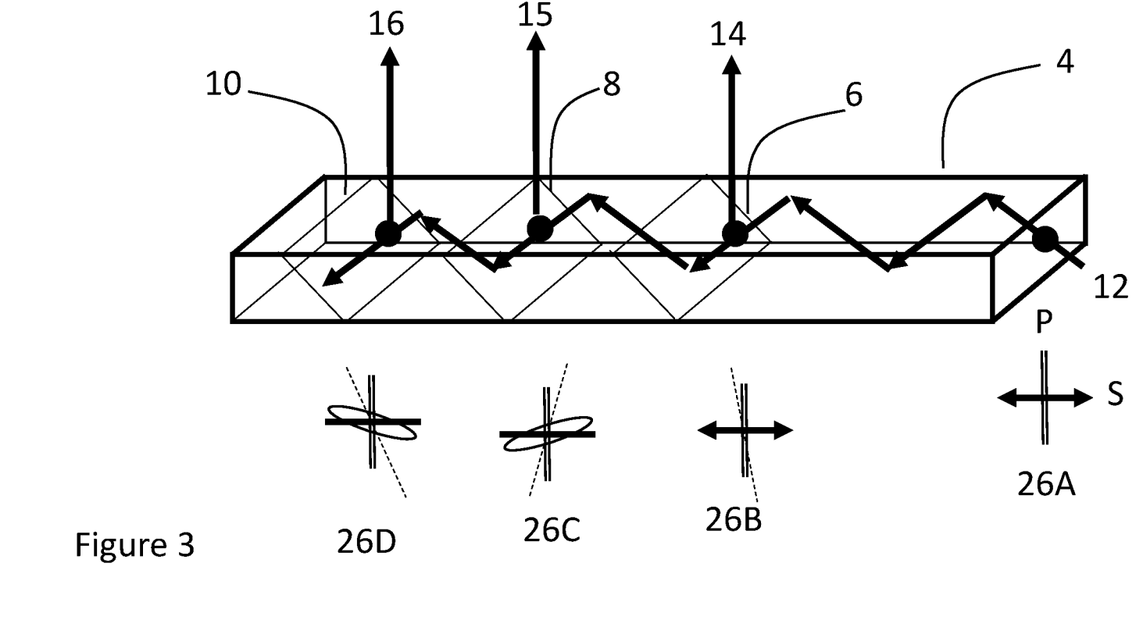
FIG. 3 is a schematic representation similar to FIG. 1, illustrating a case of injection of an S-polarized coupled-in image.

FIG. 3 shows the same architecture as in FIG. 1 but with the injection of S polarization and appropriate rotation of the structural polarizer reflection axis.

Figure 4:
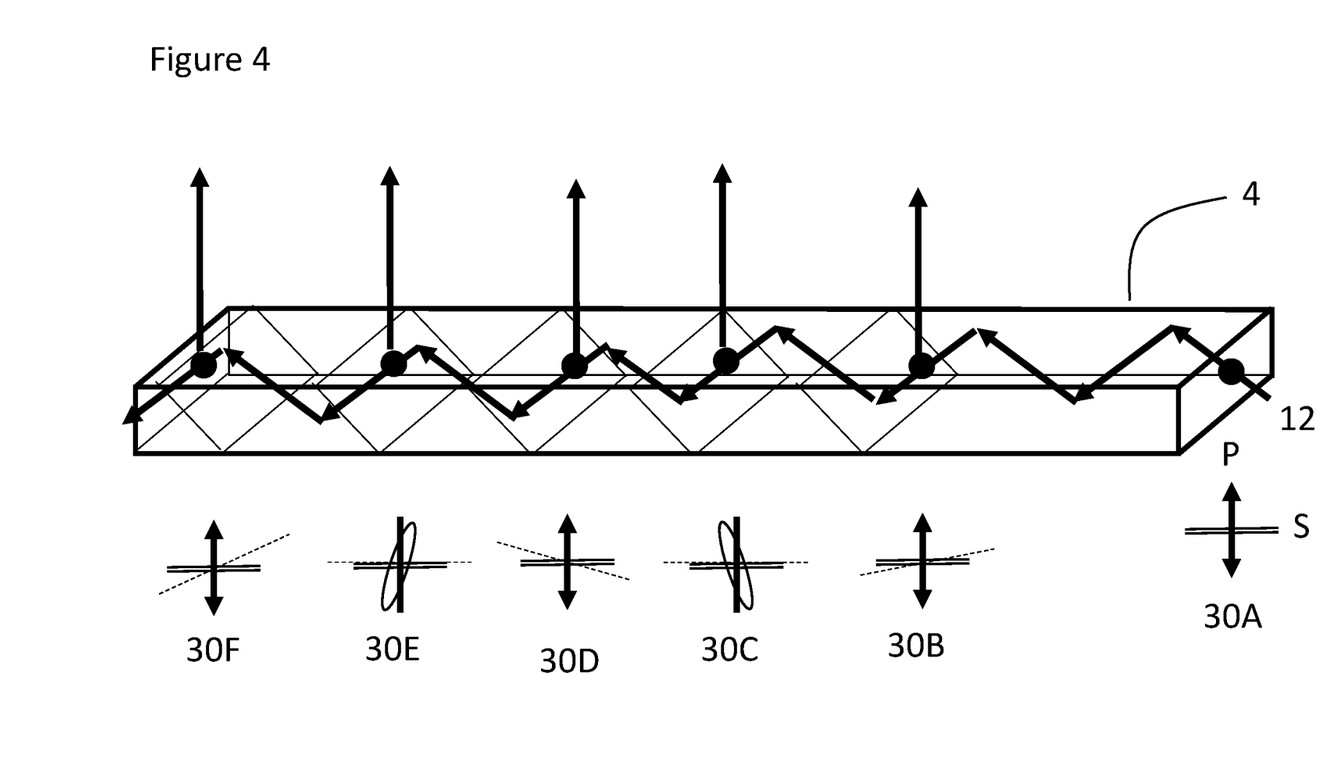
FIG. 4 is a schematic representation similar to FIG. 1, illustrating addition of on-axis structural polarizers to further stabilize polarization of light passing along the LOE.

Further stabilization of polarization orientation can be achieved by gradual rotation of the structural polarizer relative orientation between successive facets as shown in FIG. 4. The light is injected at perpendicular polarization (herein assumed to be P polarization) and impinges on the first facet having tilted structural polarizer axis 30B (same as 18B). Now the polarization of the light is drifted and the next facet has structural polarizer perpendicular axis 30C. Consequently, the off-axis light is coupled out and the transmitted light is again P polarized as it impinges on the next facet 30D (the double-headed arrow). In 30D the structural polarizer is tilted once again (preferable to a larger angle than 30B and can be in either direction). The process repeats itself in 30E and 30F. By returning intermittently to polarization parallel to the axes of the substrate, the polarization is stabilized and remains constant between the orthogonally-polarizing facet and the subsequent facet.

Other structural polarizer axis twisting profiles are also possible including maintaining constant angular twist that simplifies production. Where sufficient birefringence exists, it may be possible to employ a sequence of polarizer facets with the same orientation (zero rotation) and relying upon mixing of polarization due to the birefringence between successive facets, as discussed further below.

Figure 5A:
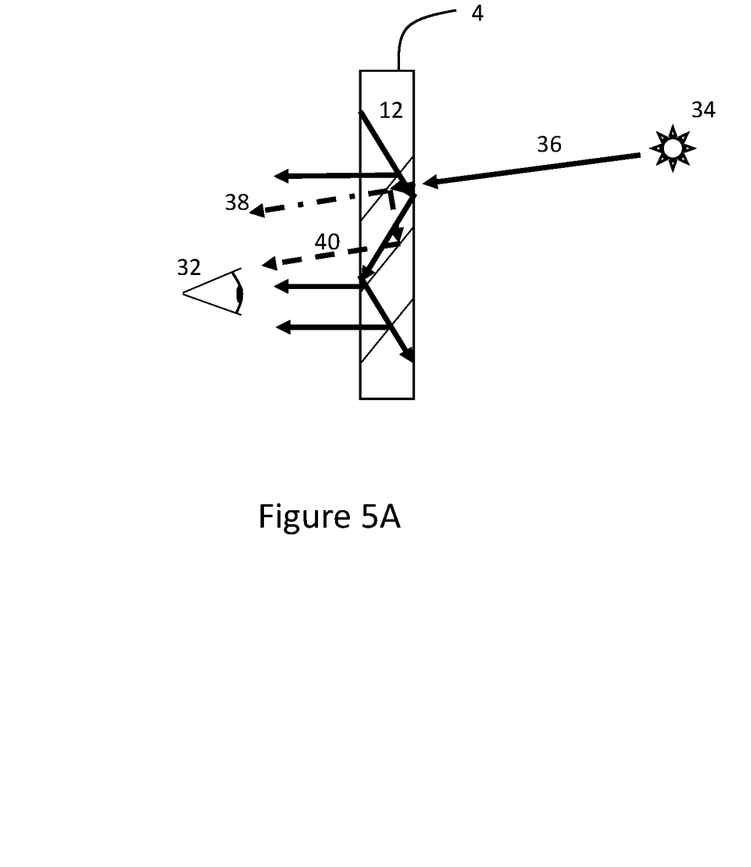
FIG. 5A is a schematic side view illustrating secondary ray paths along which an observer can observe a real-world object, thereby presenting a risk of a ghost image.

The structural polarizer also reflects ambient light, which may in some cases lead to problematic effects, as described in FIG. 5A. The waveguide 4 guides the injected light 12 and the facets transmit the light onto the eye of the observer 32 as previously described. A light source from the scenery 34 illuminates the waveguide with un-polarized light 36 that will be split by the structural polarizer to two polarizations, one that will be transmitted directly as ray 38 and the perpendicular component which will be reflected before being transmitted as ray 40.

Figure 5B:
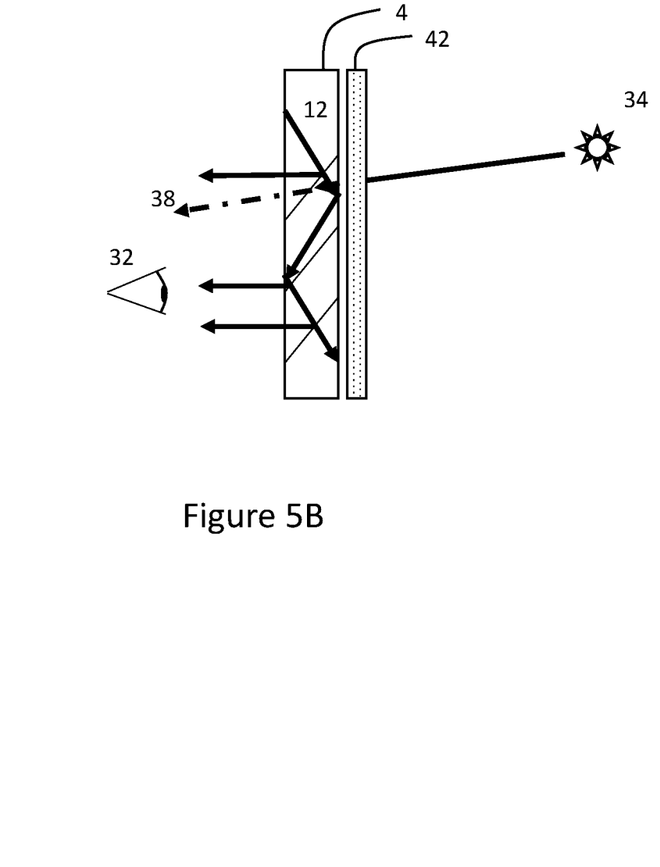
FIG. 5B is a view similar to FIG. 5A illustrating use of an external polarizer to attenuate the secondary ray paths of FIG. 5A according to an aspect of the present invention.

Although the two transmitted rays 38 and 40 are parallel, this could be disturbing for the observer if object 34 is near. FIG. 5B illustrates an approach for addressing this problem according to an embodiment of the present invention by introducing a polarizer 42 deployed parallel to the outer surface of the LOE for the outside "world". The transmission orientation of the polarizer is parallel to the average orientation of the structural polarizer transmission axes, so that reflected polarized ray 40 will be substantially attenuated. In cases in which the rotation of the structural polarizer axes between successive facets are progressively in the same direction, the axis of the external polarizer 42 is preferably chosen to be oriented according to an average of the axes of the facets as projected onto the outer major surface of the light-guide, thereby minimizing misalignment between the axes of the facets and the axis of the external polarizer.

Figure 6:
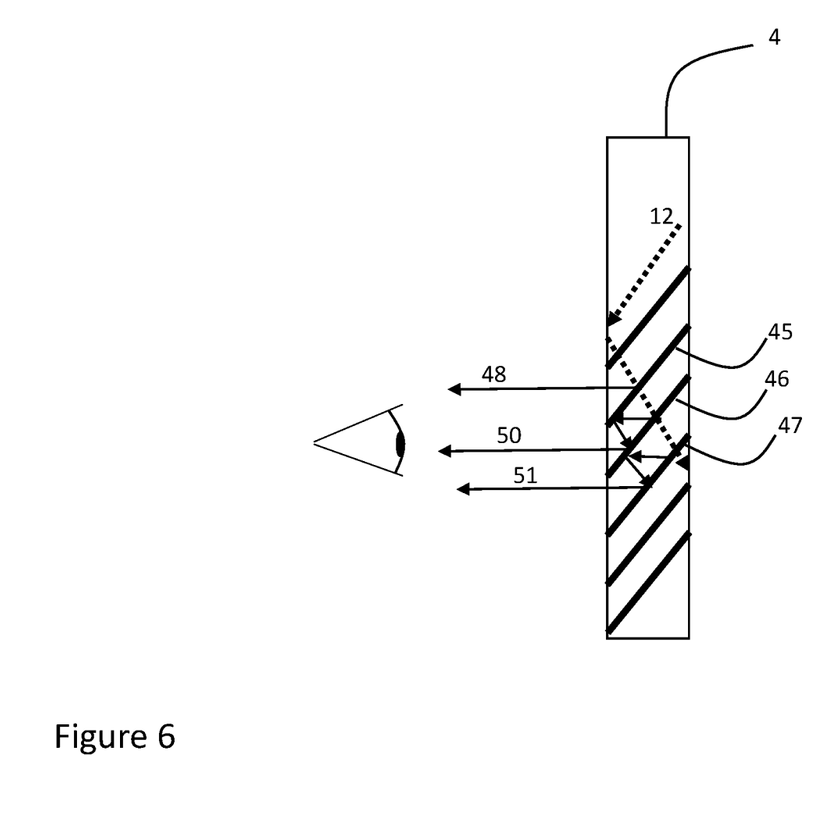
FIG. 6 is a schematic side view illustrating an LOE according to an aspect of the present invention employing overlapping facets.

FIG. 6 illustrates a configuration according to an embodiment of the present invention with increased image uniformity. The facets are overlapping (for example 45, 46 and 47) with the result that some of the light reflected by these facets will be reflected by the adjacent facet before being reflected out.

Ray 12 propagates within waveguide 4 having a predefined polarization (marked as a dotted line). As it impinges on facet 45, the perpendicular polarization component (marked as a solid line) is reflected directly outward as ray 48. As ray 12 continues to propagate, it impinges on facet 46. The reflection from this facet impinges on the adjacent facet 45, and then reflects once more by 46 before coupling out as 50. The same process generates ray 51.

It should be noted that these multiple reflections occur in the rays which have already been deflected once for coupling-out of the substrate. These rays are only a small proportion of the overall light energy propagating along the light guide, but have primarily transverse polarization so that they are efficiently reflected to undergo multiple reflections. This maximizes the "mixing" effect to enhance uniformity of the image without disrupting the propagating ray (12), which might result in distorting the propagating image.

Figure 7A:
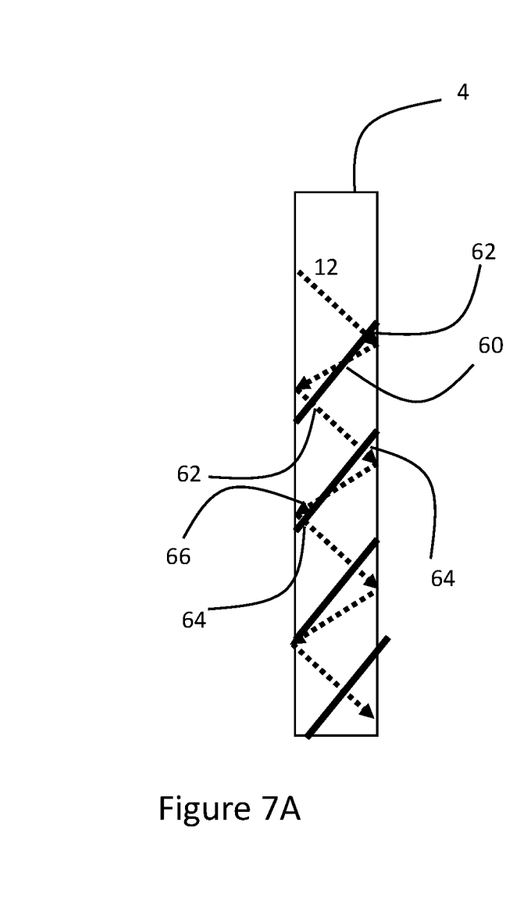
FIG. 7A is a schematic side view illustrating an implementation of an LOE according to the teachings of the present invention in which relatively shallow-angle facets and higher-angle rays may lead to a ray path undergoing more than one pass through a single facet.
Figure 7B:
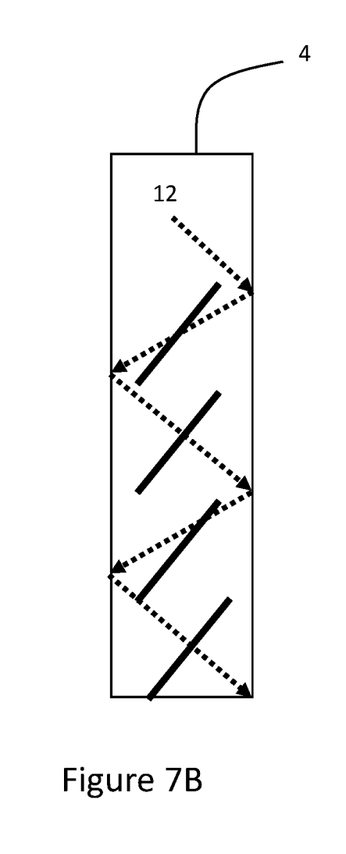
FIGS. 7B and 7C are two views similar to FIG. 7A illustrating localization of the structural polarizer reflective surfaces within a layer of the LOE spaced from the major surfaces of the LOE.

FIG. 7A show the propagation of ray 12 within waveguide 4 in a case where the angles of the facets to the waveguide axes are shallower than the angles of the light rays. This results in a geometry in which ray can pass through the facet at opposite angle 60 and pass the same facet at positive angle 62. Same process exist in 64 and 66. Passing the same facet twice may be a source of non-uniformity in the propagating illumination. Furthermore, if the transmission of the structural polarizer is not high (for example, due to absorptive losses), the multiple transitions through the facets will degrade light power. FIG. 7B shows a modified architecture where the facets do not extend across the waveguide width. Consequently, the cases of facet double pass are substantially reduced and the passes through the facets (and therefore the structural polarizer) are reduced resulting in more uniform illumination and less attenuation.

Figure 7C:
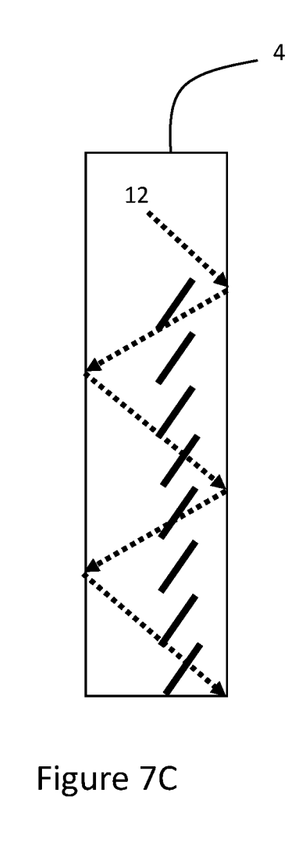

FIG. 7C shows a narrow section with facets to further improve transmission and improve uniformity. By way of one non-limiting example, the facets may span less than half, and in some cases less than a third, and in the example shown here, less than a quarter, of the overall thickness of the light guide between the major parallel surfaces. In this case the spacing between the facets is preferably small therefore further reducing the visibility of the non-uniformity to the observer. For example, in the context of a near-eye display, the distance between adjacent facets measured along the direction of propagation parallel to the major surfaces of the light guide may be no more than 2 mm, and in certain particularly preferred cases, no more than 1 mm.

In the preferred but non-limiting examples of FIGS. 7B and 7C, the facets do not extend to the major surfaces of the substrate, but rather are included in an intermediate layer. The margins described in 7B and 7C can be generated by attaching a transparent bank to the side (or both sides) of the configuration described in 7A.

Figure 8A:
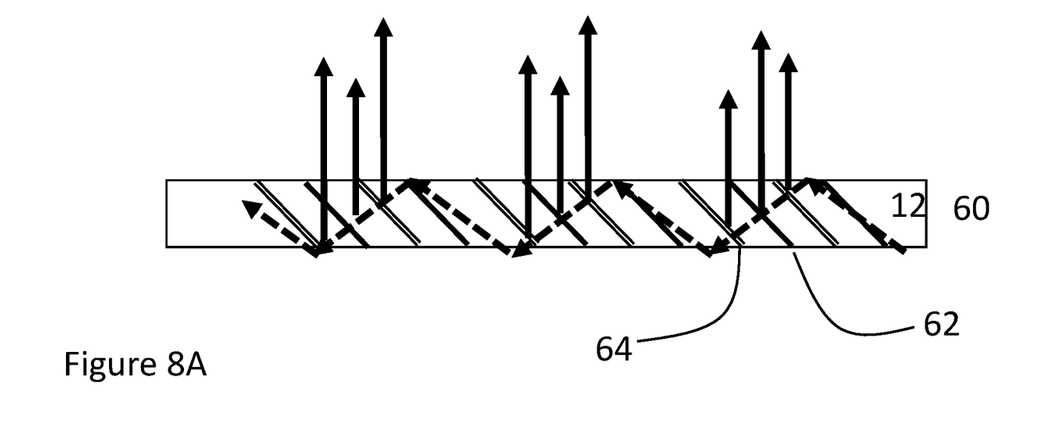
FIGS. 8A and 8B are schematic side views of LOEs according to the teachings of a further aspect of the present invention integrating structural polarizer internal surfaces with multilayer dielectric-coating partially-reflective internal surfaces within a single LOE, in interleaved and coplanar configurations, respectively.

A hybrid facet system, employing a combination of facets with structural polarizers and facets with partially-reflective dielectric coatings, may in some cases combine the advantages of the two technologies and thereby improve uniformity, energy extraction and transmittance. In FIG. 8A, the waveguide 60 incorporates structural polarizer facets 62 (designated by a single line) and dielectric facets 64 (designated by a double line). As beam 12 propagates within the waveguide, both facets reflect the light toward the observer.

Figure 8B:
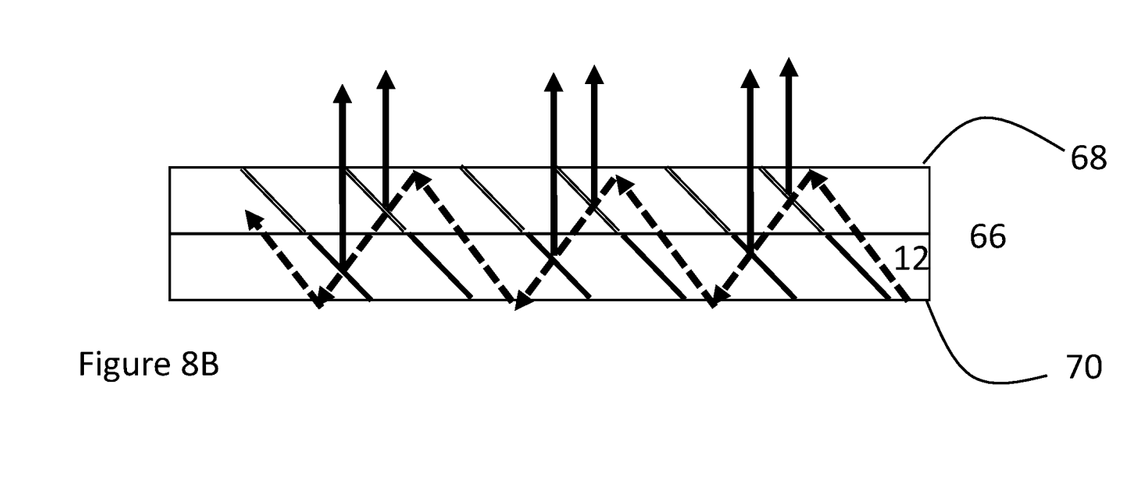

FIG. 8B shows a configuration that is simple to produce where the dielectric facets are in section 68 and the structural polarizer facets are in section 70. The two types of facets may be parallel to each other, or may be coplanar as illustrated. In an alternative set of implementations, the second set of (dielectric) facets may be differently oriented from the structural polarizer facets, to achieve two-dimensional aperture expansion, for example, according to the teachings of PCT application no. PCT/IL2018/050701 (which does not constitute prior art to this application).

A range of different structures and implementations can be implemented using this hybrid configuration:
1) Both the structural polarizer facets and the dielectric partial reflector facets reflect the S polarization.
2) The dielectric facets reflect the S polarization and the structural polarizer are oriented to reflect the P polarization.
3) The dielectric partially-reflecting facets may be identical (having a constant reflectivity) along the LOE, while variation of the structural polarizer axes angles is used to provide the required variation in overall coupling-out proportions across the LOE. This significantly reduces the production cost of the LOE.
4) Using plastic as the primary material for the light guide (uncontrolled birefringence) where the structural polarizer acts as a polarization stabilizer.
5) Overlapping facets with minimal multipath: by alternating structural polarizer and dielectric-coated facets along the waveguide, close overlap of the facets can be achieved while minimizing the cases of a coupled-out ray encountering an adjacent structural polarizer facet before exiting the LOE.

The structural polarizer facets architecture can be implemented in either a 1D waveguide, i.e., where the light is guided in 1 dimension by a single pair of parallel major surfaces, or in a 2D waveguide, i.e., where the light is guided by two pairs of orthogonal surfaces, by four-fold internal reflection.

Figure 9:
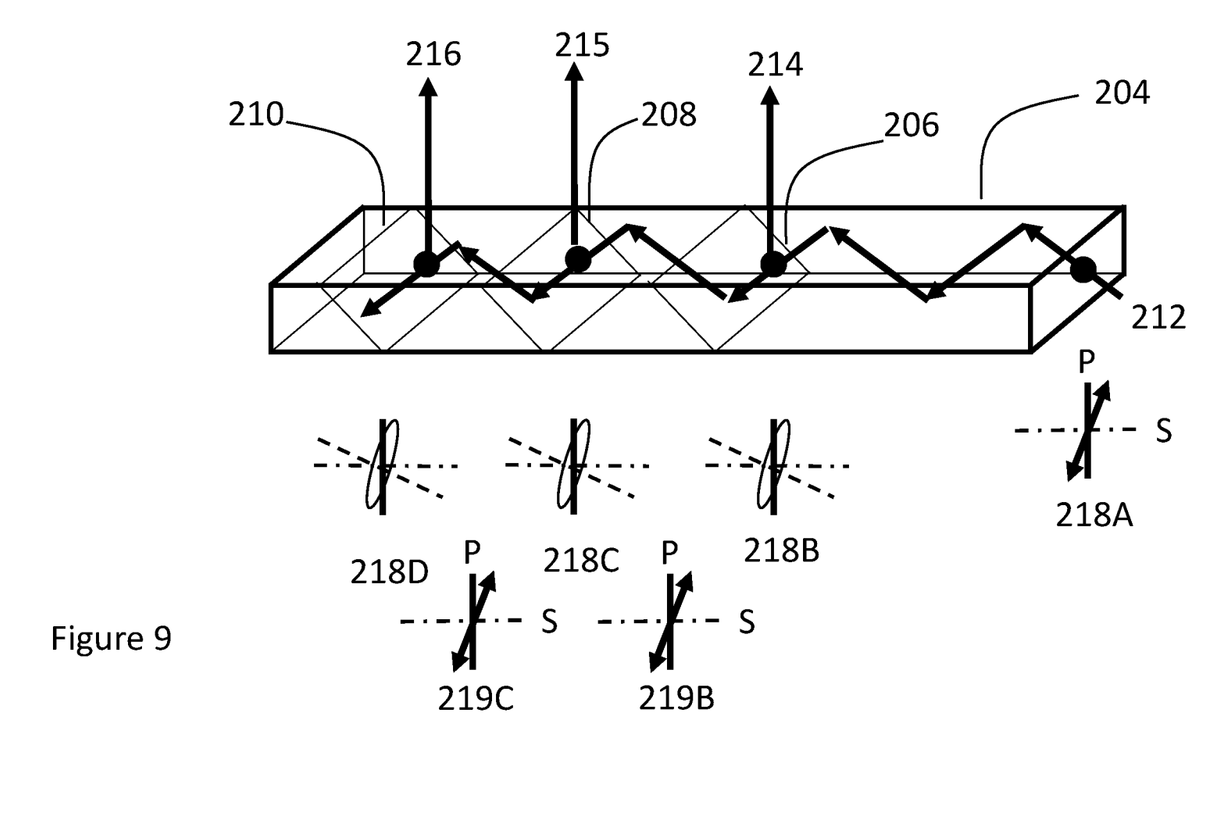
FIG. 9 is a schematic view similar to FIG. 1 illustrating the progression of polarization in a ray passing along a birefringent waveguide through a sequence of structural polarizer internal facets with the same orientation.

As mentioned above, the waveguide medium itself can be designed to introduce birefringence and thereby rotate incident polarized light. FIG. 9 shows schematically such an architecture. The waveguide 204 is rendered birefringent, for example, by stress applied during production or by attaching a birefringent film to its plane face. In this example, the birefringence axis of the waveguide is shown as a dash-dotted line. The light is injected into the waveguide at some offset from this axis, as shown in 218A. As it propagates, the waveguide birefringence and TIR rotate the polarization to be elliptical as shown in 218B. The amount of polarization rotation can be managed by the amount of waveguide birefringence relative to the TIR expected rotation. The structural polarizer reflector 206 has a tilted polarization reflection axis orientation as shown by the dotted line. As a result, after transmission, the polarization is as shown in 219B after coupling-out of the orthogonal polarization as ray 214.

In this case, it is possible to work with structural polarizers that are set at the same polarization axis angle (orientation) along part or all of the waveguide, so the above process repeats itself with regard to structural polarizers 208 and 210.

Although only the LOE structure is illustrated in most of the drawings, it will be understood that the LOE is intended for use as part of a display, typically a head-up display, which is preferably a near-eye display, such as a head-mounted display or glasses-frame supported display, for providing an image to an eye of an observer. In all such cases, the display preferably includes an image projector generating a collimated image, which is optically coupled to the LOE so as to introduce the collimated image into the light-guide optical element so as to propagate by internal reflection within the light-guide optical element, and being gradually coupled-out by the internal selectively-reflective surfaces to direct the image towards the eye of the observer.

Examples of suitable image projectors (or "PODs"), for example, employing an illumination source, a spatial light modulator such as an LCOS chip, and collimating optics, typically all arranged on surfaces of one or more PBS cube or other prism arrangement, are well known in the art. Similarly, suitable coupling-in configurations for coupling the image into the LOE, such as by use of a coupling-in reflector or by a suitably angled coupling prism, are well known in the art. For conciseness of presentation, neither the projector nor the coupling-in configuration will be discussed further herein.

It will be appreciated that the above descriptions are intended only to serve as examples, and that many other embodiments are possible within the scope of the present invention as defined in the appended claims.

What is claimed is:

1. A light-guide optical element comprising:
   (a) a transparent substrate having at least two parallel major external surfaces for guiding light within the substrate by internal reflection at said external surfaces; and
   (b) a plurality of mutually parallel internal surfaces deployed within said substrate non-parallel to said major external surfaces, at least part of each of said internal surfaces comprising a structural polarizer having a primary polarization transmission axis, said structural polarizer being substantially transparent to light polarized parallel to said primary polarization transmission axis and being at least partially reflective to light polarized perpendicular to said primary polarization transmission axis,
   wherein a principal axis of each of said internal surfaces is defined as a direction parallel to said major external surfaces, and wherein said primary polarization transmission axis for at least one of said internal surfaces is oriented obliquely to said principal axis.

2. The light-guide optical element of claim 1, wherein said primary polarization transmission axis is rotated for each successive internal surface relative to a preceding one of said internal surfaces.

3. The light-guide optical element of claim 2, wherein said primary polarization transmission axis of said structural polarizer is rotated in a first direction between a first of said internal surfaces and a subsequent one of said internal surfaces, and is rotated in a second direction, opposite to said first direction, between said subsequent one of said internal surfaces and a further subsequent one of said internal surfaces.

4. The light-guide optical element of claim 2, wherein said primary polarization transmission axis of said structural polarizer is rotated through a first angle between a first of said internal surfaces and a subsequent one of said internal surfaces, and is rotated through a second angle, greater than said first angle, between said subsequent one of said internal surfaces and a further subsequent one of said internal surfaces.

5. The light-guide optical element of claim 1, wherein said structural polarizer is substantially fully reflective to light polarized perpendicular to said primary polarization transmission axis.

6. The light-guide optical element of claim 1, wherein at least part of said substrate is formed from a material exhibiting birefringence.

7. The light-guide optical element of claim 6, wherein said primary polarization transmission axis is parallel for at least two successive internal surfaces of said plurality of said internal surfaces.

8. The light-guide optical element of claim 1, wherein said substrate has a thickness measured between said major external surfaces, and wherein said structural polarizer extends across less than an entirety of said thickness.

9. The light-guide optical element of claim 8, wherein said structural polarizer spans less than half of said thickness.

10. The light-guide optical element of claim 8, wherein said structural polarizer does not extend to either of said major external surfaces.

11. The light-guide optical element of claim 1, further comprising an additional set of mutually parallel internal surfaces deployed within said substrate non-parallel to said major external surfaces, at least part of each surface of said additional set of internal surfaces comprising a multilayer partially-reflective dielectric coating.

12. The light-guide optical element of claim 11, wherein said additional set of internal surfaces are parallel with said plurality of internal surfaces.

13. The light-guide optical element of claim 12, wherein said additional set of internal surfaces are interleaved with said plurality of internal surfaces.

14. The light-guide optical element of claim 12, wherein surfaces of said additional set of internal surfaces are coplanar with surfaces of said plurality of internal surfaces.

15. The light-guide optical element of claim 11, wherein a thickness of said substrate is subdivided into a first layer and a second layer, and wherein said plurality of internal surfaces are located within said first layer and said additional set of internal surfaces are located within said second layer.

16. A display for providing an image to an eye of an observer comprising:
    (a) the light-guide optical element of claim 1; and
    (b) an image projector generating a collimated image, said image projector being optically coupled to said light-guide optical element so as to introduce the collimated image into the light-guide optical element so as to propagate by internal reflection within the light-guide optical element, wherein said plurality of internal surfaces are oriented to couple out part of the collimated image towards the eye of the observer.

17. The display of claim 16, further comprising an absorbent polarizer deployed on a side of said substrate further from the observer, said absorbent polarizer having an axis of polarization aligned with an average direction of said primary polarization transmission axes of said structural polarizers.

* * * * *